Figure 1:
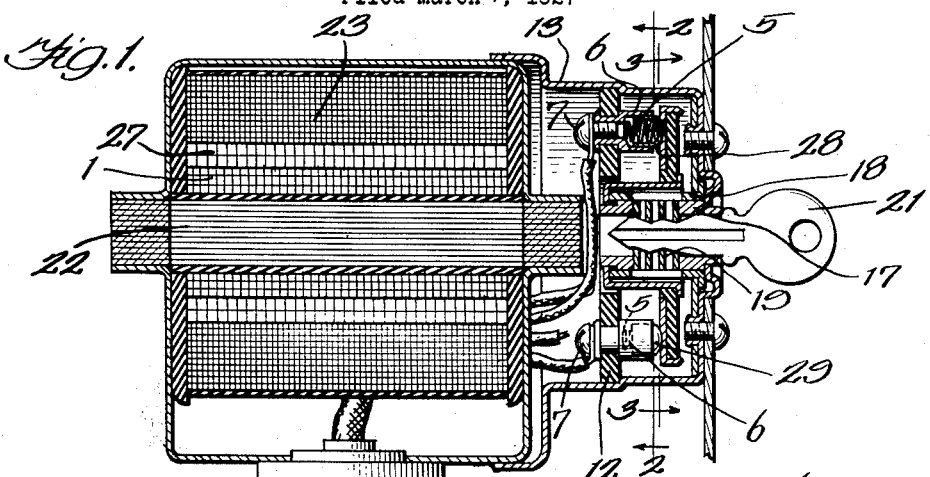

Oct. 9, 1928. 1,687,274

F. J. WATTS

AUTOMOTIVE VEHICLE IGNITION SYSTEM

Filed March 7, 1927

Inventor:
Felix J. Watts

Patented Oct. 9, 1928.

1,687,274

UNITED STATES PATENT OFFICE.

FELIX J. WATTS, OF BRONSON, MICHIGAN, ASSIGNOR TO HARRY A. DOUGLAS, OF BRONSON, MICHIGAN.

AUTOMOTIVE VEHICLE IGNITION SYSTEM.

Application filed March 7, 1927. Serial No. 173,583.

My invention relates to ignition circuit systems for internal combustion engines such, for example, as those employed in the power plants of automobiles or other automotive vehicles.

My invention relates more particularly to such a system which employs an inducing circuit that contains a primary winding and a second circuit which contains a spark plug or other gas igniting element and a winding that is in secondary relation to said primary winding. The primary or inducing circuit usually contains a battery or other source of direct current and a switch for opening and closing this circuit, the secondary or induced circuit that contains the spark plug or other gas igniting element being effective for its purpose when the primary circuit is closed. When the ignition system is employed in connection with the internal combustion hydrocarbon engine contained in the power plant of an automotive vehicle, it is the practice to provide a lock, usually key controlled, for locking the aforesaid switch in open adjustment to prevent unauthorized use of the automotive vehicle. The purpose of the lock, in prior structures, may be defeated by connecting the opened switch contacts by means of a jumper which would close the primary or inducing circuit. I provide current conducting means which is effective to impair the inductive relation of the primary and secondary windings when the ignition circuit is locked open and is closed by means other than the lock controlled switch. That is, it is effective to then render the switch controlled winding inert. In the preferred embodiment of my invention I supplement the function of the lock by means of a member which may be adjusted to absorb lines of force induced by the primary winding and thereby prevent the induction of current in the induced circuit that contains the gas igniting element or sufficiently reduce the induction of current in the gas igniting secondary circuit to prevent the gas igniting element from being effective. The member which I employ for preventing or reducing the induction of gas igniting current in the sparking circuit is preferably in the nature of a shield which is interposed between the primary and secondary windings, this shield desirably surrounding the primary winding and being surrounded by the secondary winding. In order to make it unnecessary to effect bodily movement of the shield, it is made in the form of a winding which is included in a third circuit. This third circuit is desirably governed by the lock controlled switch which is constructed to close it when the primary circuit is open and to open it when the primary circuit is closed. Thus, in effect, the shield is absent when the ignition circuit is operative and is present when the ignition circuit is adjusted to be inoperative so as to prevent it from being made operative by tampering with the switch contacts of the primary circuit.

Figure 2:
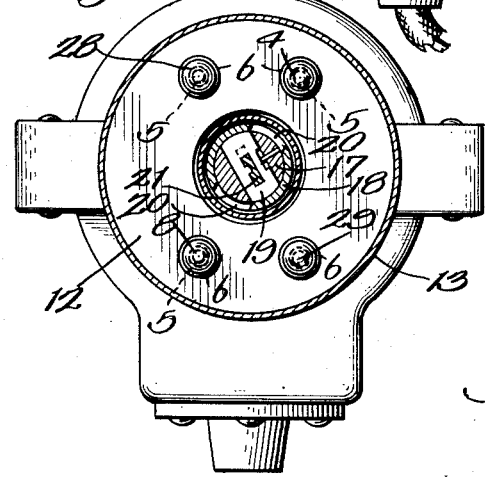
Figure 3:
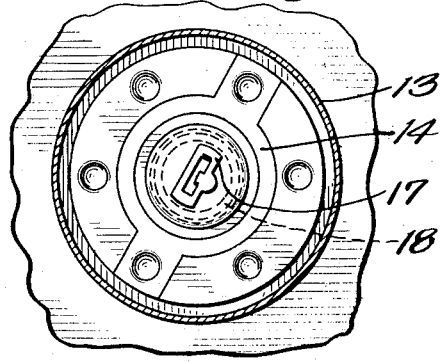
Figure 4:
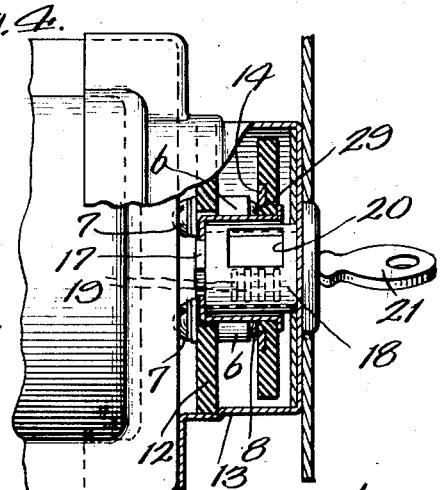
Figure 5:
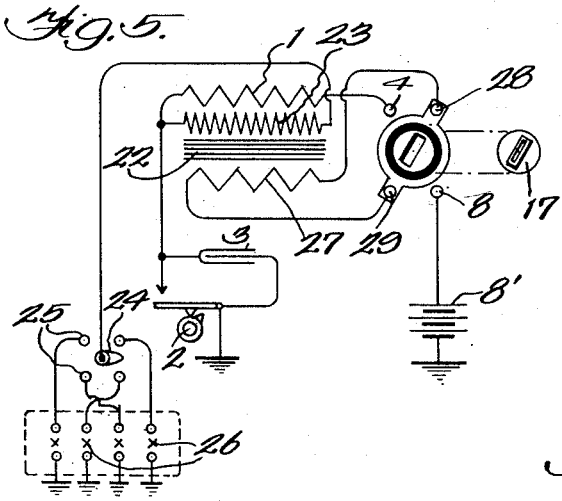

I will explain my invention more fully by reference to the accompanying drawing in which Fig. 1 is a longitudinal sectional view of a structure made in accordance with the preferred embodiment of the invention; Fig. 2 is a sectional view on line 2—2 of Fig. 1; Fig. 3 is a sectional view on line 3—3 of Fig. 1; Fig. 4 is a longitudinal view of the front portion of the structure with parts broken away; and Fig. 5 is a diagram of one circuit arrangement.

The primary winding 1 has one terminal grounded through a circuit breaker 2 whose contacts are shunted by a condenser 3. The other terminal of this winding is connected with a metallic contact 4 which is in the nature of a plunger that is pressed upon by a coiled spring 5 contained in a metallic spring barrel 6, this spring barrel being furnished with a binding screw 7 for the attachment of a wire in electrical connection therewith. The primary circuit also has another metallic contact 8 that is grounded through the battery 8', this contact being spaced apart from the metallic contact 4 and being similarly pressed upon by a coiled spring 5 which is contained in a metallic spring barrel 6 that is furnished with a binding screw 7 for the attachment of a circuit wire thereto. Said spring barrels are mounted upon an insulating disc 12 which is contained in a suitable casing 13. A metallic contact bar 14 is suitably assembled with a tumbler barrel 17. This tumbler barrel turns within a shell 18 and carries tumblers 19 that project into slots 20, in the shell 18, when the key 21, constituting a removable handle for the metallic contact bar 14, is withdrawn and from which slots said tumblers are withdrawn when the key is inserted. When the tumblers are received in said slots, the metallic contact bar 14 is out of engagement with the contacts 4 and 8. When the tumblers are removed from said slots and the tumbler barrel is turned sufficiently, the contact bar is brought into electrical connection with said contacts 4 and 8. In the first adjustment, the inducing circuit containing the primary 1 is opened. In the second adjustment, this circuit is closed. The primary winding is desirably disposed about a magnetizable core 22, the secondary winding 23 desirably surrounding the primary in the same zone therewith. This secondary winding has one terminal grounded through the interrupter and has its other terminal connected with the revolving arm 24 of a distributor whose waiting contacts 25 are successively engaged by said arm. These waiting contacts are connected with the electrodes 26 of spark plugs or other gas igniting elements that are contained in the various cylinders of the internal combustion engine that is equipped with the ignition system.

The shield which I employ is placed in an annular space which is provided for the purpose between the primary and secondary windings. In order that the shield need not be physically adjustable, it is in the form of a winding 27 which is in open circuit when the bar 14 connects the contacts 4 and 8 to make the ignition circuit effective and which is in closed circuit when this bar is locked in position in which it is out of engagement with said contacts. I desirably employ the aforesaid bar 14 for placing the winding 27 in a closed local circuit when this bar is adjusted and locked out of engagement with the contacts 4 and 8. To this end I provide plunger contacts 28 and 29 which are serially included in the circuit of winding 27 and are positioned to be engaged by the bar 14 when this bar is locked out of engagement with the contacts 4 and 8. The contacts 28 and 29 are projected from other metallic spring barrels 6 by springs 5 contained in these barrels, said barrels being also provided with binding screws 7 for electrically connecting circuit wires therewith. When the bar 14 is adjusted out of engagement with contacts 4 and 8 and into engagement with contacts 28 and 29, unauthorized use of the automotive vehicle can not be acquired by means of a jumper connecting the contacts 4 and 8 since the inducing action of the inducing circuit containing the primary winding 1 is, in effect, limited to the absorbing circuit containing the shielding winding 27, this circuit then sufficiently absorbing the lines of force induced by the primary circuit to prevent effective current from being induced in the sparking circuit which contains the normal secondary winding 23.

While the lock controlled switch illustrated is the preferred form of unitary switch mechanism employed, the invention is not to be limited thereto.

Changes may be made without departing from the invention.

Having thus described my invention, I claim:

1. The combination with an inducing circuit containing a primary winding; of a second circuit containing a gas igniting element and a winding that is in secondary relation to said primary winding; a third circuit adapted for induced relation to the primary circuit and to impair the inducing relation of this circuit to the second circuit and thereby render said gas igniting element inoperative; and means for putting the third circuit into and out of such effective induced relation to the primary circuit.

2. The combination with an inducing circuit containing a primary winding; of a second circuit containing a gas igniting element and a winding that is in secondary relation to said primary winding; a shield adapted to impair the inducing relation of the primary winding to the secondary winding and thereby render said gas igniting element inoperative, there being space between said windings for receiving said shield; and means for putting the shield into and out of its functioning relation to said primary winding.

3. The combination with an inducing circuit containing a primary winding; of a second circuit containing a gas igniting element and a winding that is in secondary relation to said primary winding, one of said windings surrounding the other; a shield adapted to impair the inducing relation of the primary winding to the secondary winding and thereby render said gas igniting element inoperative, there being space between said windings for receiving said shield; and means for putting the shield into and out of its functioning relation to said primary winding.

4. The combination with an inducing circuit containing a primary winding; of a second circuit containing a gas igniting element and a winding that is in secondary relation to said primary winding; a third circuit adapted for induced relation to the primary circuit and to impair the inducing relation of this circuit to the second circuit and thereby render said gas igniting element inoperative; and unitary switching means serving, in one adjustment, to close one of the first two circuits and open the third circuit and, in an alternative adjustment, serving to open the closed circuit and close the third circuit.

5. The combination with an inducing circuit containing a primary winding; of a second circuit containing a gas igniting element and a winding that is in secondary relation to said primary winding; a shield adapted to impair the inducing relation of the primary winding to the secondary winding and thereby render said gas igniting element inoperative, there being space between said windings for receiving said shield; and unitary means serving, in one adjustment, to open one of the first two circuits and adjust the shield into functioning relation to said primary winding and, in another adjustment, serving to close the opened circuit and adjust said shield out of its functioning relation to said primary winding.

6. The combination with an inducing circuit containing a primary winding; of a second circuit containing a gas igniting element and a winding that is in secondary relation to said primary winding, one of said windings surrounding the other; a shield adapted to impair the inducing relation of the primary winding to the secondary winding and thereby render said gas igniting element inoperative, there being space between said windings for receiving said shield; and unitary means serving, in one adjustment, to open one of the first two circuits and adjust the shield into functioning relation to said primary winding and, in another adjustment, serving to close the opened circuit and adjust said shield out of its functioning relation to said primary winding.

7. The combination with an inducing circuit containing a primary winding; of a second circuit containing a gas igniting element and a winding that is in secondary relation to said primary winding; a third circuit adapted for induced relation to the primary circuit and to impair the inducing relation of this circuit to the second circuit and thereby render said gas igniting element inoperative; means for putting the third circuit into and out of such effective induced relation to the primary circuit; and a lock serving to hold said means to maintain the third circuit in induced relation to the inducing circuit.

8. The combination with an inducing circuit containing a primary winding; of a second circuit containing a gas igniting element and a winding that is in secondary relation to said primary winding; a shield adapted to impair the inducing relation of the primary winding to the secondary winding and thereby render said gas igniting element inoperative, there being space between said windings for receiving said shield; means for putting the shield into and out of its functioning relation to said primary winding; and a lock serving to hold said means to maintain said shield in its functioning relation to said primary winding.

9. The combination with an inducing circuit containing a primary winding; of a second circuit containing a gas igniting element and a winding that is in secondary relation to said primary winding, one of said windings surrounding the other; a shield adapted to impair the inducing relation of the primary winding to the secondary winding and thereby render said gas igniting element inoperative, there being space between said windings for receiving said shield; means for putting the shield into and out of its functioning relation to said primary winding; and a lock serving to hold said means to maintain said shield in its functioning relation to said primary winding.

10. The combination with an inducing circuit containing a primary winding; of a second circuit containing a gas igniting element and a winding that is in secondary relation to said primary winding; a shield adapted to impair the inducing relation of the primary winding to the secondary winding and thereby render said gas igniting element inoperative, there being space between said windings for receiving said shield; unitary means serving, in one adjustment, to open one of the first two circuits and adjust the shield into functioning relation to said primary winding and, in another adjustment, serving to close the opened circuit and adjust said shield out of its functioning relation to said primary winding; and a lock serving to hold said means to maintain said shield in its functioning relation to said primary winding.

11. The combination with an inducing circuit containing a primary winding; of a second circuit containing a gas igniting element and a winding that is in secondary relation to said primary winding, one of said windings surrounding the other; a shield adapted to impair the inducing relation of the primary winding to the secondary winding and thereby render said gas igniting element inoperative, there being space between said windings for receiving said shield; unitary means serving, in one adjustment, to open one of the first two circuits and adjust the shield into functioning relation to said primary winding and, in another adjustment, serving to close the opened circuit and adjust said shield out of its functioning relation to said primary winding; and a lock serving to hold said means to maintain said shield in its functioning relation to said primary winding.

12. The combination with an inducing circuit containing a primary winding; of a second circuit containing a gas igniting element and a winding that is in secondary relation to said primary winding; a third circuit adapted for induced relation to the primary circuit and to impair the inducing relation of this circuit to the second circuit and thereby render said gas igniting element inoperative; unitary switching means serving, in one adjustment, to close one of the first two circuits and open the third circuit and, in an alternative adjustment, serving to open the closed circuit and close the third circuit; and a lock serving to hold said switching means in its aforesaid alternative adjustment.

13. The combination with an inducing circuit containing a primary winding; of a second circuit containing a gas igniting element and a winding that is in secondary relation to said primary winding; a third circuit adapted for induced relation to the primary circuit and to impair the inducing relation of this circuit to the second circuit and thereby render said gas igniting element inoperative; unitary switching means serving, in one adjustment, to close one of the first two circuits and open the third circuit and, in an alternative adjustment, serving to open the closed circuit and close the third circuit; and a lock serving to hold said switching means in its aforesaid alternative adjustment and including an operating element which constitutes an actuating part of said switching means.

14. The combination with an inducing circuit containing a primary winding; of a second circuit containing a gas igniting element and a winding that is in secondary relation to said primary winding; a shield adapted to impair the inducing relation of the primary winding to the secondary winding and thereby render said gas igniting element inoperative, there being space between said windings for receiving said shield; means for putting the shield into and out of its functioning relation to said primary winding; and a lock serving to hold said means to maintain said shield in its functioning relation to said primary winding and including an operating element which constitutes an actuating part of said means.

15. The combination with an inducing circuit containing a primary winding; of a second circuit containing a gas igniting element and a winding that is in secondary relation to said primary winding, one of said windings surrounding the other; a shield adapted to impair the inducing relation of the primary winding to the secondary winding and thereby render said gas igniting element inoperative, there being space between said windings for receiving said shield; means for putting the shield into and out of its functioning relation to said primary winding; and a lock serving to hold said means to maintain said shield in its functioning relation to said primary winding and including an operating element which constitutes an actuating part of said means.

16. The combination with an inducing circuit containing a primary winding; of a second circuit containing a gas igniting element and a winding that is in secondary relation to said primary winding; a shield adapted to impair the inducing relation of the primary winding to the secondary winding and thereby render said gas igniting element inoperative, there being space between said windings for receiving said shield; unitary means serving, in one adjustment, to open one of the first two circuits and adjust the shield into functioning relation to said primary winding and, in another adjustment, serving to close the opened circuit and adjust said shield out of its functioning relation to said primary winding; and a lock serving to hold said means to maintain said shield in its functioning relation to said primary winding and including an operating element which constitutes an actuating part of said means.

17. The combination with an inducing circuit containing a primary winding; of a second circuit containing a gas igniting element and a winding that is in secondary relation to said primary winding, one of said windings surrounding the other; a shield adapted to impair the inducing relation of the primary winding to the secondary winding and thereby render said gas igniting element inoperative, there being space between said windings for receiving said shield; unitary means serving, in one adjustment, to open one of the first two circuits and adjust the shield into functioning relation to said primary winding and, in another adjustment, serving to close the opened circuit and adjust said shield out of its functioning relation to said primary winding; and a lock serving to hold said means to maintain said shield in its functioning relation to said primary winding and including an operating element which constitutes an actuating part of said means.

18. The combination with an inducing circuit containing a primary winding; of a second circuit containing a gas igniting element and a winding that is in secondary relation to said primary winding; a third circuit; and switching means for opening and closing one of the first two aforesaid circuits, the third circuit having a contact terminal structure in association with said switching means to close the third circuit and thereby make one of the aforesaid windings ineffective when said switching means is in circuit closing adjustment with respect to the one of the first two aforesaid circuits controlled by the switching means.

19. The combination with an inducing circuit containing a primary winding; of a second circuit containing a gas igniting element and a winding that is in secondary relation to said primary winding; a third circuit; switching means for opening and closing one of the first two aforesaid circuits, the third circuit having a contact terminal structure in association with said switching means to close the third circuit and thereby make one of the aforesaid windings ineffective when said switching means is in circuit closing adjustment with respect to the one of the first two aforesaid circuits controlled by the switching means; and a lock serving to hold said switching means in circuit opening adjustment.

20. The combination with an inducing circuit containing a primary winding; of a second circuit containing a gas igniting element and a winding that is in secondary relation to said primary winding; a third circuit; switching means for opening and closing one of the first two aforesaid circuits, the third circuit having a contact terminal structure in association with said switching means to close the third circuit and thereby make one of the aforesaid windings ineffective when said switching means is in circuit closing adjustment with respect to the one of the first two aforesaid circuits controlled by the switching means; and a lock serving to hold said switching means in circuit opening adjustment and including an operating element which constitutes an actuating part of said means.

In witness whereof, I hereunto subscribe my name.

FELIX J. WATTS.